US008499452B2

(12) United States Patent
Hallmann (10) Patent No.: US 8,499,452 B2
(45) Date of Patent: Aug. 6, 2013

(54) METHOD FOR CONNECTING AT LEAST TWO HEAT EXCHANGER PLATES

(75) Inventor: Mike Hallmann, Schwerin (DE)

(73) Assignee: Gesmex GmbH, Schwerin (DE)

( * ) Notice: Subject to any disclaimer, the term of this patent is extended or adjusted under 35 U.S.C. 154(b) by 494 days.

(21) Appl. No.: 12/744,599

(22) PCT Filed: Jun. 27, 2008

(86) PCT No.: PCT/EP2008/005287
§ 371 (c)(1),
(2), (4) Date: Aug. 17, 2010

(87) PCT Pub. No.: WO2009/068119
PCT Pub. Date: Jun. 4, 2009

(65) Prior Publication Data
US 2011/0005076 A1 Jan. 13, 2011

(30) Foreign Application Priority Data
Nov. 26, 2007 (DE) .......................... 10 2007 056 717

(51) Int. Cl.
*B21D 39/06* (2006.01)
*B21D 39/00* (2006.01)
(52) U.S. Cl.
USPC ...................................... 29/890.039; 228/161
(58) Field of Classification Search
USPC ........ 228/155, 159–162; 29/890.03–890.054; 156/250–271
See application file for complete search history.

(56) References Cited

U.S. PATENT DOCUMENTS 3,792,519 A * 2/1974 Haver .......................... 29/896.62
3,822,742 A * 7/1974 Stowell .......................... 165/170
(Continued)

FOREIGN PATENT DOCUMENTS

DE    10 2005 026 328 B4    11/2007
FR          2 791 291 A      9/2000
(Continued)

OTHER PUBLICATIONS

English translation of PCT International Preliminary Examination Report dated Mar. 8, 2010 issued in connection with related International Application No. PCT/EP2008/005287 (5 pages).

(Continued)

*Primary Examiner* — David Bryant
*Assistant Examiner* — Jacob Cigna
(74) *Attorney, Agent, or Firm* — Robert P. Michal; Lucas & Mercanti, LLP (57) ABSTRACT

The invention relates to a method for connecting at least two heat exchanger plates so as to form a plate packet for a heat exchanger, said plate packet being provided with at least one passage defined by through holes in the heat exchanger plates. With the aid of this method, the heat exchanger plates are to be braced well to one another so that high-quality welding seams having a high strength can be produced. To this end, the invention suggests that two respective heat exchanger plates should be clamped together in the proximity of the edge of the future through hole, and that the respective heat exchanger plates should be welded to one another in pairs with at least one circumferentially extending welding seam marking the edge of the future through hole, the diameter of at least one circumferentially extending welding seam being at least as large as the diameter of the future through hole, and that the through hole should subsequently be cut out of the heat exchanger plates that have been welded together.

20 Claims, 4 Drawing Sheets

U.S. PATENT DOCUMENTS

| | | | | |
|---|---|---|---|---|
| 4,577,380 A * | 3/1986 | Warner | | 29/890.043 |
| 4,644,129 A * | 2/1987 | Miller | | 219/121.63 |
| 4,688,631 A * | 8/1987 | Peze et al. | | 165/166 |
| 4,723,601 A * | 2/1988 | Ohara et al. | | 165/153 |
| 4,857,697 A * | 8/1989 | Melville | | 219/121.63 |
| 5,327,958 A * | 7/1994 | Machata et al. | | 165/167 |
| 5,638,899 A * | 6/1997 | Blomgren et al. | | 165/166 |
| 2006/0081098 A1 * | 4/2006 | Toshiaki | | 83/13 |

FOREIGN PATENT DOCUMENTS

| | | | |
|---|---|---|---|
| JP | 2006-182215 A | | 7/2006 |
| WO | WO 98/21061 A1 | | 5/1998 |
| WO | WO 99/67041 A | | 12/1999 |
| WO | WO 9967041 A1 * | | 12/1999 |

OTHER PUBLICATIONS

PCT International Search Report mailed Nov. 27, 2008 issued in connection with the corresponding PCT International Application No. PCT/EP2008/005287.

PCT International Preliminary Examination Report dated Mar. 8, 2010 issued in connection with the corresponding PCT International Application No. PCT/EP2008/005287.

German Search Report mailed Mar. 10, 2009 issued by German Patent Office in connection with the corresponding German Patent Application No. DE 10 2007 056 717.2.

Partial English translation of PCT International Preliminary Examination Report dated Mar. 8, 2010 issued in connection with the corresponding PCT International Application No. PCT/EP2008/005287 along with PCT International Preliminary Examination Report dated Mar. 8, 2010 issued in connection with the corresponding PCT International Application No. PCT/EP2008/005287 (6 pages).

Office Action (Notice of Reasons for Rejection) mailed Feb. 19, 2013 in related Japanese Application No. 2010-523294 and English translation thereof (6 pages).

* cited by examiner

METHOD FOR CONNECTING AT LEAST TWO HEAT EXCHANGER PLATES

This application is a U.S. National Phase Application under 35 USC 371 of International Application PCT/EP2008/005287 filed Jun. 27, 2008, which claims priority from German Application No. DE 10 2007 056 717.2 filed Nov. 26, 2007, the entire disclosure of each of which is incorporated herein by reference.

The invention relates to a method for connecting at least two heat exchanger plates to form a plate packet for a heat exchanger, said plate packet having at least one passage defined by through holes in the heat exchanger plates.

Normally, these plate packets are produced such that, after a forming process, the heat exchanger plates are given the desired outer diameter and through holes having the desired final diameter are cut into the heat exchanger plates. Two respective heat exchanger plates are then welded to one another along the edges of these through holes and the resultant pairs of plates are then welded to one another on the margins of the heat exchanger plates. This plate packet is then inserted in a pressure vessel, in which one medium flows through the pressure vessel and another medium flows through the plate packet. In this way, a heat exchanger having a large heat transfer surface and high pressure resistance is realized.

This method is, however, disadvantageous insofar as the welding seams on the through holes and in the outer areas of the heat exchanger plates must be realized in narrow fillets, whereby welding and fixing is made more difficult.

It is therefore the object of the present invention to provide a method which facilitates the fixing and welding steps.

To this end, the present invention is so conceived that two respective heat exchanger plates are clamped together in the proximity of the edge of the future through hole, and that the respective heat exchanger plates are welded to one another in pairs with at least one circumferentially extending welding seam marking the edge of the future through hole, the diameter of at least one circumferentially extending welding seam being at least as large as the diameter of the future through hole, and that the through hole is subsequently cut out of the heat exchanger plates that have been welded together.

It follows that the through holes are cut into the heat exchanger plates only after said heat exchanger plates have been welded to one another. For the purpose of welding, the heat exchanger plates are placed one on top of the other in such a way that the areas in which the through holes are to be formed are superimposed on one another. The heat exchanger plates are clamped together in the proximity of the edge of the future through hole. What matters in this respect is, however, not the precise position, but that the two heat exchanger plates are in good contact with one another in the area in which welding will take place. It follows that the heat exchanger plates need not be clamped together directly adjacent the edge of the future through hole, but they may also be braced to one another on the outer margin of the heat exchanger plates. In view of the fact that the through holes have not yet been cut out, a large amount of material will, however, still exist in the area of the edge of the future through holes, so that the heat exchanger plates can effectively be clamped together and held in position at this location. In addition, there is enough space for the welding seams. The sheet metal plates of the two heat exchanger plates overlap, i.e. a lap seam is produced. Hence, a welding seam of high strength and good quality can be produced. The through holes are preferably circular, but they may also have an arbitrary other shape.

An advantageous variant of the method can be so conceived that each heat exchanger plate is provided with a fixing hole which is arranged inside of the edge of the future through hole and which is expanded so as to form the through hole when the heat exchanger plates have been welded to one another. Making use of this fixing hole, it will be easier to align the heat exchanger plates relative to one another and to clamp them together subsequently. The expansion i.e. the cutting out of the through holes can be executed with various methods, e.g. punching or laser cutting.

An expedient embodiment may also be so conceived that at least two through holes are cut into each heat exchanger plate. The finished plate packet will then have two passages, i.e. a respective inlet and a respective outlet, so that the medium conducted in the plate packet will flow through all the plates in the same direction and a countercurrent heat exchanger can be realized in this way.

According to a particularly advantageous variant of the present method, the respective two heat exchanger plates are welded to one another by means of two neighbouring, circumferentially extending welding seams marking the edge of the future through hole. Hence, the welding seams can be reduced in width, whereby the heat input in the heat exchanger plates will be reduced. This is advantageous for avoiding heat distortion, especially in the case of heat exchanger plates consisting of very thin metal sheets.

In addition, it turned out to be very expedient when the two welding seams are implemented such that they overlap at least partially. The diameter of the outer welding seam is therefore only slightly larger than the diameter of the inner welding seam and the overlapping area of the welding seams is configured such that both welding seams extend in this area also into the lower heat exchanger plate. It is thus possible to form a broad welding seam with high strength and low heat input.

According to a preferred embodiment, each through hole is cut into the heat exchanger plate in the area of the circumferentially extending welding seam in which said welding seam extends into both heat exchanger plates. It follows that the cut is provided in the area in which no gap exists between the two heat exchanger plates. This is important for laser cutting methods, since these methods do not allow cutting through an air gap. Furthermore, the through hole will then have a continuous wall. The medium flowing through the plate packet can thus not enter a gap between the heat exchanger plates. This is advantageous, especially in the case of aggressive media which might otherwise cause corrosion.

Another advantageous method variant can be so conceived that the resultant heat exchanger plate pairs are welded to one another along the outer margins of the heat exchanger plates with a welding seam, said outer margins of the heat exchanger plates being bent up so that a V-shaped groove is formed between the outer margins of two respective heat exchanger plates, the subsequent areas of the heat exchanger plates are superimposed on one another and in planar contact with one another, and the welding seam extends in the said V-shaped groove. In this way, a fully welded, gas-tight plate packet is obtained. The welding seam is a flange weld, the welding seam extending in the V-shaped groove. Due to the fact that the welding seam extends in the groove, easy centering of the welding head and an effective examination of the welding seam are possible. This method step is particularly advantageous when the heat exchanger plate pairs have been produced according to the above-described method steps, by welding two respective heat exchanger plates to one another in the margin area of the through holes prior to cutting said through holes. It is, however, also possible to produce the heat exchanger plate pairs in some other way and to weld the margins of these heat exchanger plate pairs then together at the V-shaped groove. Hence, separate protection is claimed for this method step.

The heat exchanger plates are preferably provided with embossments and the outer margins of the heat exchanger plates are bent up during the application of these embossments. By means of the embossments a turbulent flow can be generated in the heat exchanger plates, whereby the transfer of heat can be improved. By simultaneously executing the steps of applying the embossments and bending up the outer margins of the heat exchanger plates, one working step can be saved.

In addition, it proved to be advantageous when the welding seams on the heat exchanger plates are produced by laser welding. By means of laser welding, a very reliable and permanently safe connection between the heat exchanger plates can be accomplished. The thermal load applied to the heat exchanger plates by the laser welding process is only small, whereby heat distortion will be avoided. In the area of the through holes, i.e. at the lap seam, the depth of the welding seam corresponds to approximately twice the plate thickness of a heat exchanger plate. On the margins of the heat exchanger plates, the depth of the welding seam, i.e. the radial dimension of the flange weld, corresponds to approximately four times the plate thickness of a heat exchanger plate.

In the following, embodiments of the present invention will be explained in more detail with reference to a drawing, in which.

Figure 1:
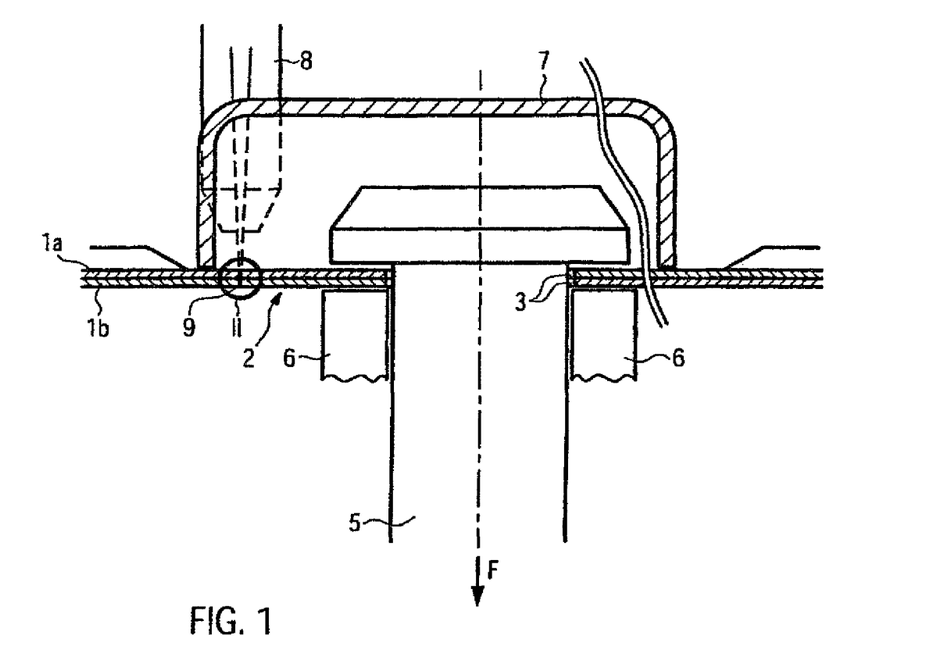
FIG. 1 shows how two heat exchanger plates are welded to one another in the areas provided for forming therein the through holes.

FIG. 1 shows how two heat exchanger plates 1a, 1b are welded to one another in the proximity of the edge 2 of the future through holes. The two heat exchanger plates 1a, 1b lie on top of each other at least in the area in which the through holes will be cut later on, and are braced to one another in the proximity of the edge 2 of the future through holes. To this end, each of the heat exchanger plates 1a, 1b is provided with a fixing hole 3, the diameter of which is smaller than the future final diameter of the through holes and which is arranged inside of the future through holes. A centering pin 5 having a head is passed through each of the fixing holes 3. The centering pin 5 is drawn downwards with the force F and, in the proximity of the edge 2 of the future through holes, it presses the two heat exchanger plates 1a, 1b together and onto a clamping jaw 6. The fixing holes 3 are preferably circular. This, however, is not absolutely necessary. It is also imaginable that the fixing holes have some other shape and are e.g. rectangular.

The heat exchanger plates 1a, 1b need not necessarily have a fixing hole. It is also imaginable that the heat exchanger plates 1a, 1b are braced relative to one another without making use of a fixing hole or that the bracing does not take place in close proximity to the edge of the future through holes, e.g. due to a spacer ring arranged in the boundary area of the heat exchanger plates. The important thing is that, in the area of the welding seam, the heat exchanger plates lie on top of one another without any gap being formed between them.

For welding the heat exchanger plates 1a, 1b to one another, a shielding bell 7 is applied to the upper one of the two heat exchanger plates 1a, 1b. Via the shielding bell 7, a shielding gas is supplied prior to, during and after the welding process. A welding head 8 is arranged in the shielding bell 7, said welding head 8 welding the two heat exchanger plates 1a, 1b to one another. To this end, the welding head 8 is moved horizontally on a circular path so that a circular welding seam 9 is produced. The diameter of the circular welding seam 9 is at least as large as the diameter of the through holes 4 to be produced later on, i.e. the welding seam 9 marks the edge 2 of the future through hole. Neither the through holes nor the welding seam must unequivocally be circular. Also other shapes, e.g. rectangles, are imaginable.

Preferably, two through holes are cut into each heat exchanger plate 1a, 1b. In this case, two fixing holes 3 can be provided, which have inserted therein the centering pins 5 by means of which the heat exchanger plates 1a, 1b are mechanically positioned. Bracing of the heat exchanger plates 1a, 1b is preferably executed pneumatically. For establishing multiple flow ducts within the plate packet, it is, however, also possible to cut only one through hole in each heat exchanger plate or only one through hole, alternately in respective heat exchanger plates.

Figure 2:
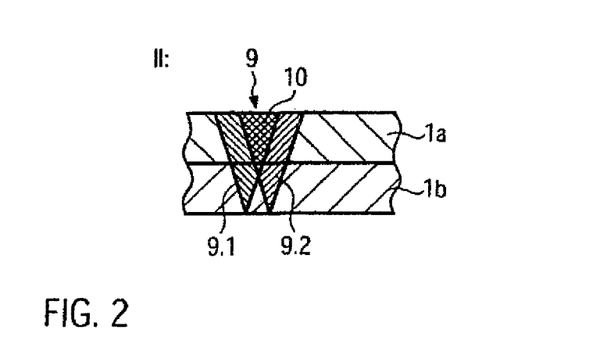
FIG. 2 shows an enlarged view of detail II of FIG. 1, said enlarged view showing the welding seam.

FIG. 2 shows an enlarged view of the welding seam 9. As can be seen, the heat exchanger plates 1a, 1b lie on top of each other in planar contact with one another. The welding seam 9 extends through both heat exchanger plates 1a, 1b and is therefore a lap seam. The welding seam 9 is formed by two juxtaposed narrow welding seams 9.1, 9.2 merging with one another in the area 10. The depth of the welding seam 9, i.e. the area of the welding seam 9 in which the materials of the two heat exchanger plates 1a, 1b are fused, corresponds to at least twice the plate thickness of a heat exchanger plate 1a, 1b.

Figure 3:
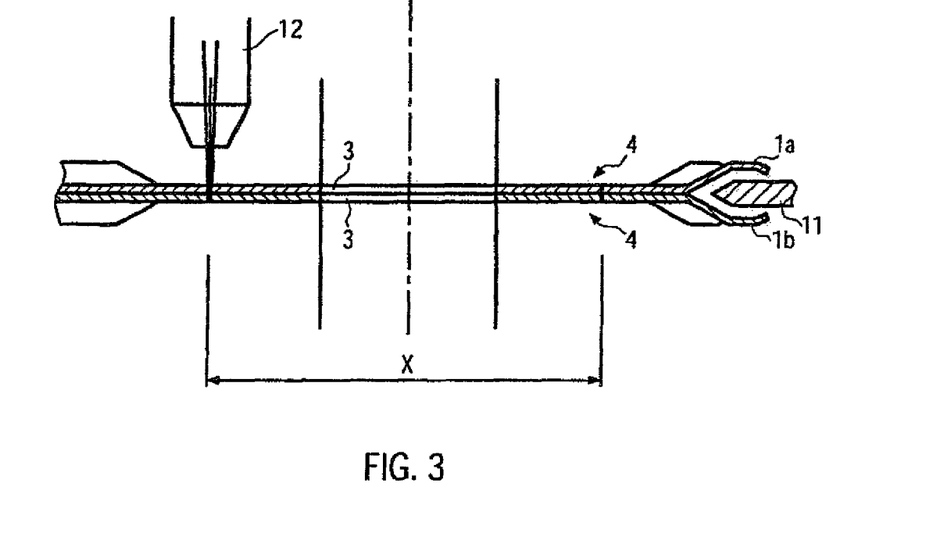
FIG. 3 shows how the through holes are cut into the heat exchanger plates.

When the two heat exchanger plates 1a, 1b have been welded to one another, the shielding bell 7 is removed and the through holes 4 are cut into the heat exchanger plates 1a, 1b. As can be seen in FIG. 3, a laser cutting head 12 is used for this purpose. The heat exchanger plates 1a, 1b are held by a spacer ring 11 arranged in an outer area of said heat exchanger plates 1a, 1b. This spacer ring 11 is used for positioning the heat exchanger plates 1a, 1b as well as for dissipating the heat produced during the welding and cutting processes, and it may already be used for the purpose of positioning in the preceding welding step. The laser cutting head 12 cuts out the through holes 4 such that they have a diameter X. The diameter X is selected such that the laser cutting head 12 cuts through the inner welding seam 9.2 in an area in which said welding seam 9.2 has already entered the lower heat exchanger plate 1b. A gap can then no longer be seen at the cut edge of the through holes 4. The diameter X of the through holes 4 may, however, also be smaller than the inner diameter of the welding seam 9, 9.2.

The heat exchanger plates 1a, 1b shown in FIG. 3 are provided with fixing holes 3. As has already been described, these fixing holes 3 are not absolutely necessary. If no fixing holes are provided, the first openings cut into the heat exchanger plates 1a, 1b by laser cutting with the cutting head 12 are the through holes 4.

When two respective heat exchanger plates have been welded to one another in the proximity of the edges 2 of the through holes so as to form pairs of heat exchanger plates, these pairs of heat exchanger plates are welded to one another along the outer margins 13 of the heat exchanger plates so as to form plate packets.

Figure 4:
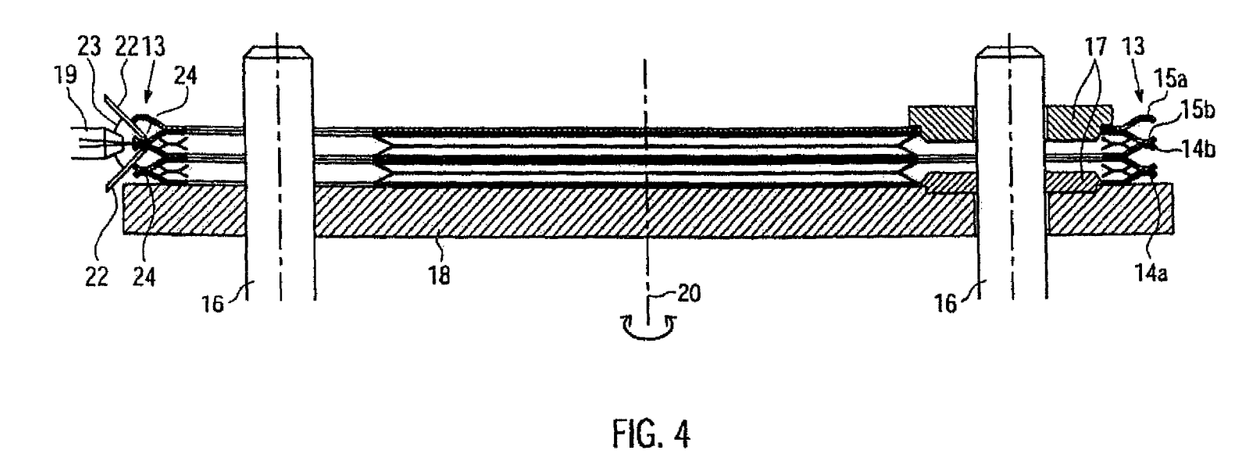
FIG. 4 shows how the heat exchanger plate pairs are welded to one another on their outer margins.

FIG. 4 shows a welding device with heat exchanger plate pairs 14a, 14b; 15a, 15b fixed therein for welding in the margin areas 13 thereof. The heat exchanger plate pairs 14a, 14b; 15a, 15b are centered with the aid of further centering pins 16 and centering bushes 17 and they are braced with respect to a substrate 18. Making use of a welding head 19, a welding seam 24 is produced in the margin area 13 of the heat exchanger plates 14a and 15b of the two heat exchanger plate pairs 14a, 14b; 15a, 15b. The welding head 19 is here stationary, the whole device comprising the substrate 18 and the heat exchanger plate pairs 14a, 14b; 15a, 15b fixed in position thereon rotates about the axis 20. Preferably, more than two pairs of heat exchanger plates are braced to one another on the substrate 18. In this case, the heat exchanger plate pairs arranged on the substrate 18 are, one after the other, welded to one another along their outer areas 13.

Figure 5:
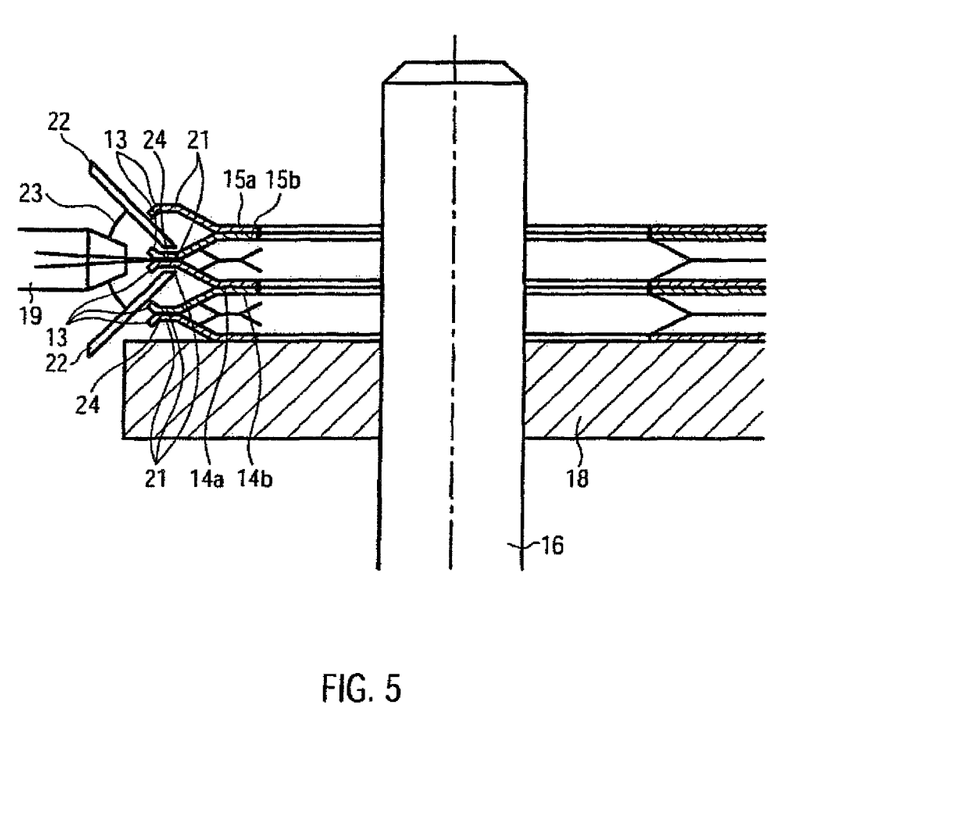
FIG. 5 shows an enlarged representation of the welding device according to FIG. 4.

FIG. 5 shows an enlarged representation of the margin areas 13 of the heat exchanger plate pairs 14a, 14b; 15a, 15b with the welding head 19. The margin areas 13 of the heat exchanger plates 14a, 14b; 15a, 15b are bent up, so that a V-shaped groove is formed between two heat exchanger plates 14a, 15b of two superimposed heat exchanger plate pairs 14a, 14b; 15a, 15b. The regions 21 of the heat exchanger plates 14a, 14b; 15a, 15b adjoining the V-shaped groove are again flat and are in planar contact with one another. These flat regions 21 are pressed together by two lenticular clamping elements 22 secured to the welding head 19. The welding head 19 has additionally arranged thereon a shielding bell 23 which supplies a shielding gas prior to, during and after the welding process. The welding head 19 is directed towards the V-shaped groove defined by the bent margins 13 and joins the superimposed heat exchanger plates 14a, 15b in the area of this V-shaped groove, i.e. in the area of the flat regions 21 adjoining this V-shaped groove, with a flange weld 24. During the welding process, the whole clamping device including the substrate 18 is rotated by 360° about the axis 20, whereas the welding head 19 stands still. Also heat exchanger plate pairs which were not connected to one another at the through holes in accordance with the above-described method, but which were joined in some other way, e.g. by hitherto used methods, can thus be welded to one another on their outer edges.

The welding head 19 is able to centre itself in the V-shaped groove. Simultaneously, an optical examination of the welding seam can be executed in the V-shaped groove, the seam sensor system being able to accurately detect and follow up the position of the welding seam in said V-shaped groove.

The heat exchanger plates 14a, 14b; 15a, 15b may have embossments which are produced already prior to welding the individual heat exchanger plates 14a, 14b; 15a, 15b to one another so as to form pairs of heat exchanger plates. Preferably, the margins 13 of the heat exchanger plates 14a, 14b; 15a, 15b are bent up in the forming step in which also the embossments are embossed into the plates.

The welding seams 9, 9.1, 9.2 in the area 2 of the through holes as well as the welding seams in the margin areas 13 are gas-tight.

The heat exchanger plates are welded to one another in the area of the through holes as well as in the outer areas preferably by means of a laser welding process. Also the through holes 4 are preferably cut by means of a laser. In this case, one head can be used for all the welding and cutting steps. It is, however, also imaginable to produce the through holes 4 in some other way, e.g. by punching. The through holes as well as the heat exchanger plates are preferably round. Other shapes are, however, imaginable as well.

It follows that, by means of the method described hereinbefore, a fully welded plate packet is obtained, which has provided therein at least one passage defined by the through holes 4 and which can be inserted in an additional pressure vessel. It is, however, also operable as a separate pressure vessel.

The additional pressure vessel also comprises an inlet and an outlet, so that the pressure vessel and the plate packet arranged therein define a pressure-resistant plate heat exchanger with two chambers in which the same pressure or different pressures prevail.

The invention claimed is:

1. A method for connecting at least two heat exchanger plates so as to form a plate packet for a heat exchanger, said plate packet being provided with at least one passage defined by through holes in the heat exchanger plates, the method comprising clamping together two respective heat exchanger plates in a proximity of a circumferential edge of a future through hole, and welding the respective heat exchanger plates to one another in pairs with at least one circumferentially extending welding seam marking the edge of the future through hole, wherein the diameter of at least one circumferentially extending welding seam being at least as large as a diameter of the future through hole, and wherein the future through hole is subsequently cut out of the heat exchanger plates that have been welded together.

2. The method according to claim 1, further comprising the steps of providing each heat exchanger plate with a fixing hole which is arranged inside of the edge of the future through hole and which is expanded so as to form the passage when the heat exchanger plates have been welded to one another.

3. The method according to claim 2, further comprising the step of cutting at least two passages into each heat exchanger plate.

4. The method according to claim 2, further comprising step of welding the respective two heat exchanger plates to one another by means of two neighbouring, circumferentially extending welding seams marking the edge of the future through hole.

5. The method according to claim 2, further comprising the step of cutting each passage into the heat exchanger plates in the area of the circumferentially extending welding seam in which said welding seam extends into both heat exchanger plates.

6. The method according to claim 2, further comprising the steps of welding the resultant heat exchanger plate pairs to one another along outer margins of the heat exchanger plates with a welding seam, bending up said outer margins of the heat exchanger plates so that a V-shaped groove is formed between the outer margins of two respective heat exchanger plates, superimposing subsequent areas of the heat exchanger plates on one another and in planar contact with one another, and extending the welding seam of the outer margins in the said V-shaped groove.

7. The method according to claim 2, further comprising the step of producing the welding seams on the heat exchanger plates by means of laser welding.

8. The method according to claim 1, further comprising the step of cutting at least two passages into each heat exchanger plate.

9. The method according to claim 8, further comprising step of welding the respective two heat exchanger plates to one another by means of two neighbouring, circumferentially extending welding seams marking the edge of the future through hole.

10. The method according to claim 8, further comprising the step of cutting each passage into the heat exchanger plates in the area of the circumferentially extending welding seam in which said welding seam extends into both heat exchanger plates.

11. The method according to claim 8, further comprising the steps of welding the resultant heat exchanger plate pairs to one another along outer margins of the heat exchanger plates with a welding seam, bending up said outer margins of the heat exchanger plates so that a V-shaped groove is formed between the outer margins of two respective heat exchanger plates, superimposing subsequent areas of the heat exchanger plates on one another and in planar contact with one another, and extending the welding seam of the outer margins in the said V-shaped groove.

12. The method according to claim 1, further comprising of welding the respective two heat exchanger plates to one another by means of two neighbouring, circumferentially extending welding seams marking the edge of the future through hole.

13. The method according to claim 12, further comprising the step of overlapping, at least partially, the two welding seams.

14. The method according to claim 12, further comprising the step of cutting each passage into the heat exchanger plates in the area of the circumferentially extending welding seam in which said welding seam extends into both heat exchanger plates.

15. The method according to claim 12, further comprising the steps of welding the resultant heat exchanger plate pairs to one another along outer margins of the heat exchanger plates with a welding seam, bending up said outer margins of the heat exchanger plates so that a V-shaped groove is formed between the outer margins of two respective heat exchanger plates, superimposing subsequent areas of the heat exchanger plates on one another and in planar contact with one another, and extending the welding seam of the outer margins in the said V-shaped groove.

16. The method according to claim 1, further comprising the step of cutting each passage into the heat exchanger plates in the area of the circumferentially extending welding seam in which said welding seam extends into both heat exchanger plates.

17. The method according to claim 16, further comprising the steps of welding the resultant heat exchanger plate pairs to one another along outer margins of the heat exchanger plates with a welding seam, bending up said outer margins of the heat exchanger plates so that a V-shaped groove is formed between the outer margins of two respective heat exchanger plates, superimposing subsequent areas of the heat exchanger plates on one another and in planar contact with one another, and extending the welding seam of the outer margins in the said V-shaped groove.

18. The method according to claim 1, further comprising the steps of welding the resultant heat exchanger plate pairs to one another along outer margins of the heat exchanger plates with a welding seam, bending up said outer margins of the heat exchanger plates so that a V-shaped groove is formed between the outer margins of two respective heat exchanger plates, superimposing subsequent areas of the heat exchanger plates on one another and in planar contact with one another, and extending the welding seam of the outer margins in the said V-shaped groove.

19. The method according to claim 18, the method further comprising the steps of providing the heat exchanger plates with embossments, and bending up the outer margins of the heat exchanger plates during application of the embossments.

20. The method according to claim 1, further comprising the step of producing the welding seams on the heat exchanger plates by means of laser welding.

* * * * *

UNITED STATES PATENT AND TRADEMARK OFFICE
CERTIFICATE OF CORRECTION

PATENT NO. : 8,499,452 B2
APPLICATION NO. : 12/744599
DATED : August 6, 2013
INVENTOR(S) : Mike Hallmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Fifteenth Day of September, 2015

Michelle K. Lee
*Director of the United States Patent and Trademark Office*